United States Patent
Hedtke

(10) Patent No.: US 9,841,307 B2
(45) Date of Patent: Dec. 12, 2017

(54) MULTIVARIABLE GUIDED WAVE RADAR PROBE

(71) Applicant: Rosemount Inc., Chanhassen, MN (US)

(72) Inventor: Robert C. Hedtke, Young America, MN (US)

(73) Assignee: Rosemount Inc., Chanhassen, MN (US)

( * ) Notice: Subject to any disclaimer, the term of this patent is extended or adjusted under 35 U.S.C. 154(b) by 520 days.

(21) Appl. No.: 14/501,954

(22) Filed: Sep. 30, 2014

(65) Prior Publication Data

US 2016/0091357 A1    Mar. 31, 2016

(51) Int. Cl.
| | |
|---|---|
| G01F 23/284 | (2006.01) |
| G01S 13/88 | (2006.01) |
| G01S 13/86 | (2006.01) |

(52) U.S. Cl.
CPC .......... G01F 23/284 (2013.01); G01S 13/88 (2013.01); *G01S 13/86* (2013.01)

(58) Field of Classification Search
CPC .............................. G01F 23/284; G01S 13/88
USPC .......................................................... 342/124
See application file for complete search history.

(56) References Cited

U.S. PATENT DOCUMENTS

| | | | | |
|---|---|---|---|---|
| 4,254,482 | A | * 3/1981 | Newman | G01F 1/002 342/124 |
| 5,651,286 | A | * 7/1997 | Champion | G01F 23/284 324/642 |
| 5,822,274 | A | * 10/1998 | Haynie | G01F 23/2962 367/908 |
| 5,954,526 | A | * 9/1999 | Smith | G01F 23/284 439/136 |
| 5,960,214 | A | 9/1999 | Sharpe, Jr. et al. | |
| 6,298,454 | B1 | 10/2001 | Schleiss et al. | |
| 6,490,543 | B1 | 12/2002 | Jaw | |
| 7,255,002 | B2 | 8/2007 | Gravel et al. | |
| 7,262,607 | B2 | 8/2007 | Champion et al. | |
| 7,477,059 | B2 | 1/2009 | Carobbio | |
| 7,532,155 | B2 | 5/2009 | Kleman et al. | |
| 7,586,435 | B1 | 9/2009 | Edvardsson | |
| 7,636,059 | B1 | 12/2009 | Edvardsson | |
| 7,703,613 | B2 | * 4/2010 | Haslem | B01D 17/0214 137/577 |
| 7,882,736 | B2 | 2/2011 | Schumacher | |
| 2002/0169514 | A1 | 11/2002 | Eryurek et al. | |

(Continued)

FOREIGN PATENT DOCUMENTS

EP            0646234 B1     7/1999

OTHER PUBLICATIONS

International Search Report and Written Opinion from PCT Application Serial No. PCT/US2015/053211, dated Dec. 18, 2015, 8 pages.

(Continued)

*Primary Examiner* — Peter M Bythrow
(74) *Attorney, Agent, or Firm* — Kinney & Lange, P.A.

(57) ABSTRACT

A multivariable fluid level detection system comprising a guided wave radar probe with sensor or sensors integral to the probe for producing sensor signal(s), a transmitter for transmitting guided microwave pulses down the probe, a receiver for receiving reflected microwave pulses, and a processor for producing a measurement of fluid level based upon a time difference between transmission of a pulse and receipt of a reflected pulse and the sensor signal(s).

28 Claims, 3 Drawing Sheets

(56) References Cited

U.S. PATENT DOCUMENTS

| | | | | |
|---|---|---|---|---|
| 2005/0088307 | A1* | 4/2005 | Schaffer | G01F 23/284 340/612 |
| 2006/0044145 | A1* | 3/2006 | Akerstrom | G01F 23/284 340/612 |
| 2007/0194981 | A1* | 8/2007 | Hagg | G01F 23/18 342/124 |
| 2008/0143583 | A1* | 6/2008 | Welle | G01F 23/284 342/124 |
| 2009/0093983 | A1* | 4/2009 | Trafford | G01F 23/2962 702/100 |
| 2009/0322593 | A1* | 12/2009 | Hall | G01F 23/284 342/124 |
| 2010/0301878 | A1* | 12/2010 | Armbruster | G01F 23/0061 324/676 |
| 2011/0005312 | A1* | 1/2011 | Hopper | G01F 23/0046 73/313 |
| 2011/0283809 | A1* | 11/2011 | Pihlaja | G01F 1/74 73/861.04 |
| 2012/0085180 | A1* | 4/2012 | Carton | G01F 23/284 73/862.59 |
| 2012/0144901 | A1* | 6/2012 | Pfeiffer | G01N 9/002 73/54.41 |
| 2012/0319891 | A1* | 12/2012 | Edvardsson | H01Q 1/225 342/124 |
| 2013/0009803 | A1 | 1/2013 | Edvardsson | |
| 2013/0269414 | A1* | 10/2013 | Ferraro | G01F 23/284 73/1.73 |
| 2013/0314275 | A1 | 11/2013 | Fredriksson et al. | |
| 2014/0083183 | A1* | 3/2014 | Edvardsson | G01F 25/0061 73/290 V |
| 2014/0085131 | A1* | 3/2014 | Widahl | G01F 23/284 342/124 |
| 2014/0159743 | A1* | 6/2014 | Dayal | G01F 23/284 324/649 |
| 2014/0208845 | A1* | 7/2014 | Zlotnick | G01F 22/00 73/290 V |
| 2015/0253176 | A1* | 9/2015 | Jirskog | G01F 23/284 342/58 |
| 2015/0276461 | A1* | 10/2015 | Guzman | G01F 23/284 73/290 V |
| 2015/0300866 | A1* | 10/2015 | Liberman | G01F 23/284 342/124 |
| 2015/0377681 | A1* | 12/2015 | Kleman | G01F 25/0061 73/290 V |
| 2016/0054164 | A1* | 2/2016 | Hershey | G01F 23/284 73/292 |

OTHER PUBLICATIONS

International Preliminary Report on Patentability, for PCT Patent Application No. PCT/US2015/053211, dated Apr. 4, 2017, 11 pages.

* cited by examiner

MULTIVARIABLE GUIDED WAVE RADAR PROBE

BACKGROUND

The present invention relates to guided wave radar measurement used to detect the level of a fluid within an enclosed tank.

A guided wave radar tank probe is inserted into a tank from the top and submerged into process fluids. The probe is then used to send guided electromagnetic waves into the fluid or fluids contained within the tank. Electromagnetic waves are sent through the probe by a transmitter. Reflection occurs when the waves encounter a fluid with a different dielectric constant. At this point, part of the energy will be reflected back in the form of a reflected wave. The unreflected portion of the wave will continue through the fluid until it reaches another fluid with a different dielectric constant, the bottom of the tank, or the end of the probe. All of the reflections are received by a receiver.

Reception occurs after waves are reflected back by the surface of the fluids within the tank. The speed of the wave and the strength of the wave reflection are dependent on the dielectric constant of the fluid(s) through which the wave travels. After receipt, the reflection or reflections are processed for timing differentials. These timing differentials are converted to a distance and the level of fluid contained within the tank is then calculated.

Several factors, such as errant transmission or reception of the electromagnetic wave, improper installation of wires or connecting pipes, a change in tank pressure or temperature, a change in tank fluid flow rate, a change in fluid concentration, a change in fluid density, or the measuring of level of fluids with a very low dielectric constant (such as oil which has a dielectric constant that is about eighty times less than water) may influence the accuracy of the level calculation. An inaccurate calculation causes incorrect reporting of fluid levels within the tank, which may lead to false alarms and unnecessary stoppages in the process for which the tank is being used.

Attempts have been made to overcome level inaccuracies. Radar systems that send multiple radar signals through one or multiple transceivers have been used to calculate multiple tank levels for comparison. However, these systems, while good at detecting failure of one radar component, are still susceptible to other distortion-causing system factors described above.

Further attempts at overcoming radar inaccuracy have been made by adding individual, non-integral pressure sensors at fixed locations. However, these sensors are limited in accuracy and usefulness by their placement in the tank. This solution is also difficult and expensive to install because the sensors are external to the probe assembly, requiring additional tank modifications.

SUMMARY

In one embodiment, a multivariable fluid level detection system comprises a guided wave radar probe with a first sensor integral to the probe for producing a first sensor signal that is a function of a first sensed parameter, a transmitter for transmitting guided microwave pulses down the probe, a receiver for receiving reflected microwave pulses, and a processor for producing a measurement of fluid level based upon a time difference between transmission of a pulse and receipt of a reflected pulse, and upon the first sensor signal.

In another embodiment, a multivariable fluid level detection system comprises a guided wave radar probe. The probe includes a transmitter for transmitting guided microwave pulses down the probe, a receiver for receiving reflected microwave pulses, a plurality of sensors integrated into the probe that produce sensor signals that are a function of sensed parameters, and a processor for producing a measurement output based upon a time from transmission of a guided microwave pulse to receipt of a reflected microwave pulse and upon the plurality of sensed signals.

Another embodiment includes a method for transmitting guided wave pulses down a probe assembly into a first fluid. The guided waves reflect off the first fluid and are then detected. The method further includes producing a first signal that is a function of a first sensed parameter. The first signal is produced by a first sensor, which is integral to the probe assembly. A measurement output is then produced based upon a time from transmission of the guided wave pulses to receipt of the reflected wave pulses and the first sensed parameter.

DETAILED DESCRIPTION

According to techniques of this disclosure, fluid level detection can be accomplished more accurately by integrating one or more sensors into a guided wave radar probe. In addition to transmitting a single or multiple guided wave(s), detecting the reflection of the wave(s), and calculating a level based on the wave detection(s), additional parameters within the tank are sensed by the one or more sensors. These sensors provide additional parameters that, in conjunction with the guided wave radar measurement, can provide a more accurate and dependable level measurement inside a tank. Further, integrating these additional sensors into the probe system lowers the cost of system construction and installation, and the cost of tank service.

Figure 1:
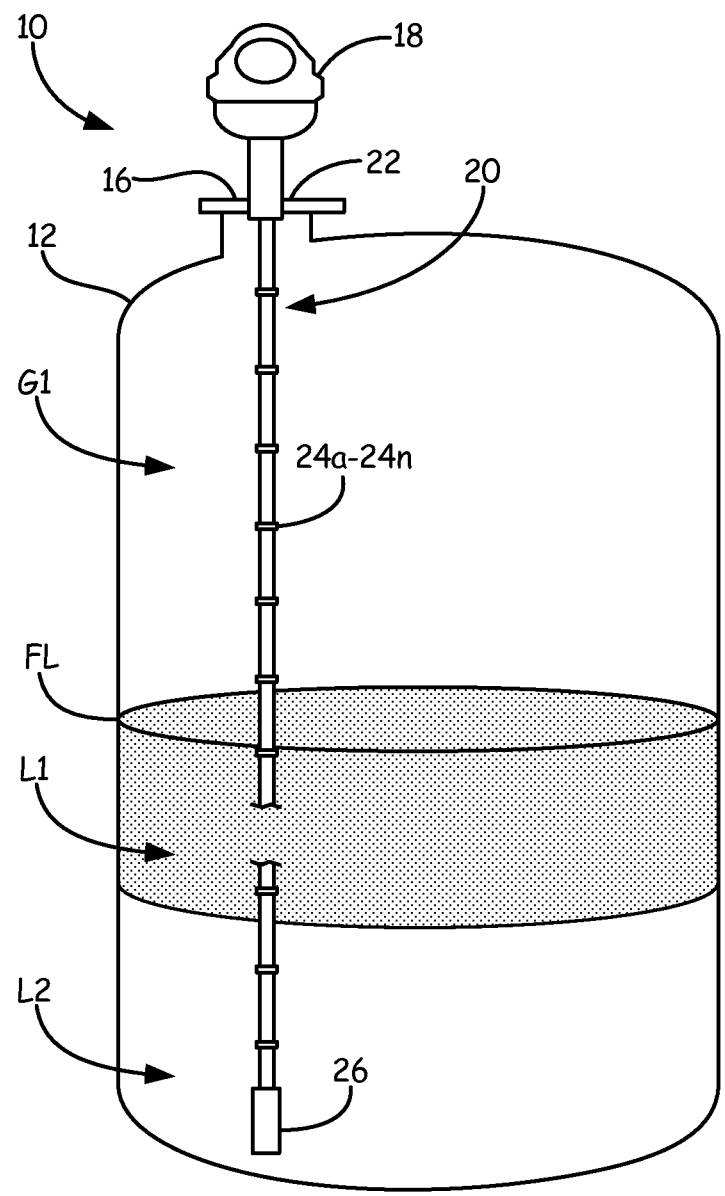
FIG. 1 is a cross-sectional view illustrating an embodiment of a multivariable level detection system in accordance with a first embodiment of the present disclosure.

FIG. 1 is a cross sectional view of an embodiment illustrating multivariable level detection system (MLD) 10 for detecting level FL of fluid within tank 12 using multiple variables. Tank 12 contains first liquid L1, second liquid L2, and third fluid G1. Fluid level FL represents the interface between third fluid G1 (a gas) and first liquid L1 (the upper liquid within tank 12). Tank 12 includes tank mounting interface 16, to which MLD 10 is mounted.

MLD 10 includes device head 18, probe assembly 20, and MLD mounting interface 22. Probe assembly 20 includes sensors 24a-24n, and weight 26. Device head 18 also includes a guided wave radar (GWR) system, sensor system, and other internal circuitry (refer to FIG. 2).

MLD 10 is mounted to tank 12 at MLD mounting interface 22, where MLD mounting interface 22 connects to tank mounting interface 16. Probe assembly 20 is inserted into tank 12 and is submerged in gas G1, first liquid L1, and second liquid L2. Sensors 24a-24n are mounted to probe assembly 20 and are exposed to gas G1, first liquid L1, and second liquid L2. Weight 26 is mounted near the end of probe assembly 20. Device head 18 is physically connected to probe assembly 20. In an alternate embodiment, a rigid probe assembly may be used, in which case weight 26 may not be required.

MLD 10 calculates, measures, monitors, and reports fluid level FL within tank 12. More specifically, the level of first liquid L1 (such as oil) within tank 12 is measured through probe assembly 20. Tank 12 may also contain a second liquid L2 (such as water), and gas G1 (such as air) which is located above liquids L1 and L2. Probe assembly 20 has multiple means of sensing parameters to provide an accurate measurement of level 14 of first liquid L1. Measurements are taken by probe assembly 20 and communicated to the GWR system and the sensor system within device head 18. Calculations and monitoring occur within device head 18, which are ultimately outputted to users through various means.

Figure 2:
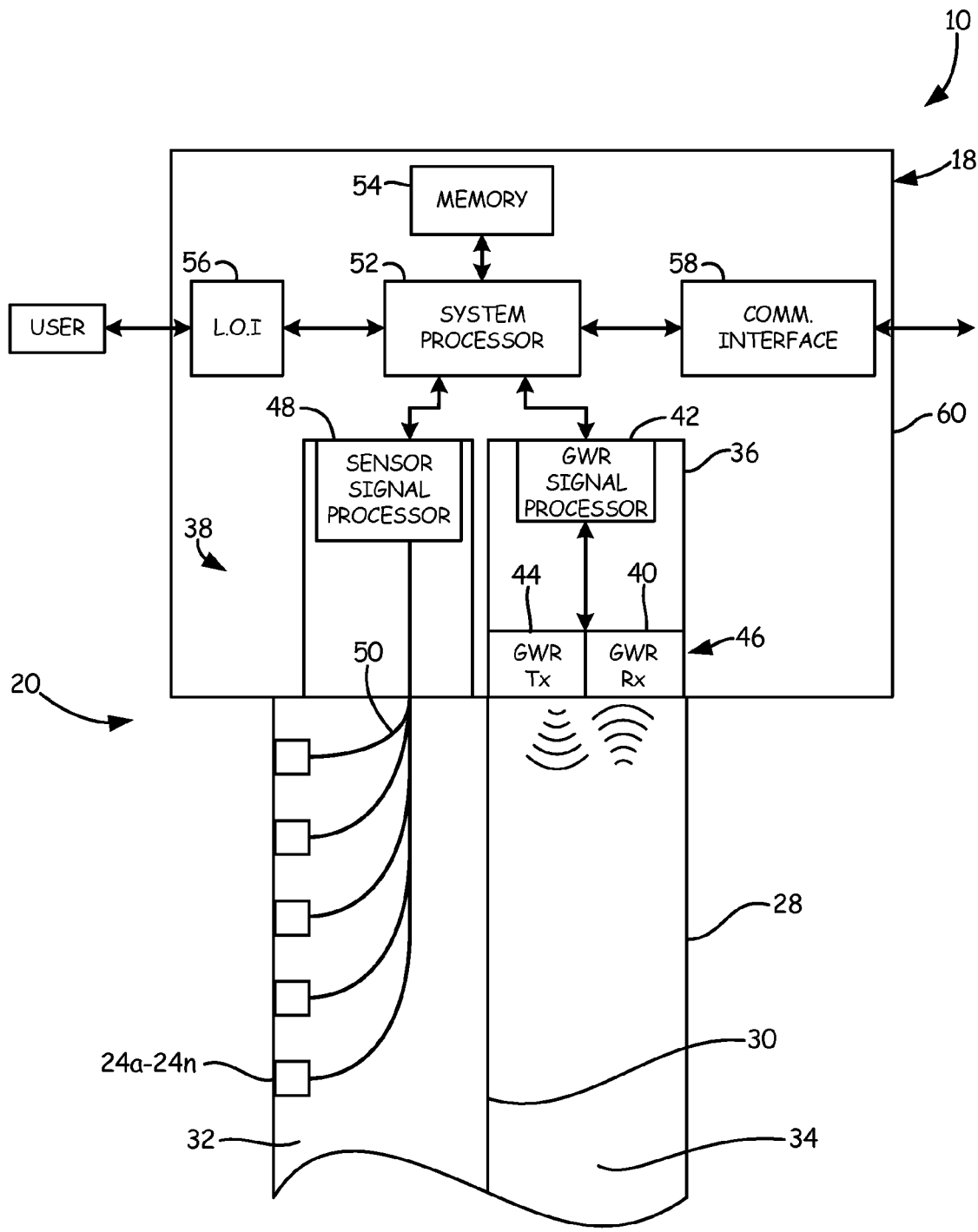
FIG. 2 is a block diagram illustrating a multivariable level detection system of the present disclosure.

FIG. 2 is a block diagram illustrating one embodiment of a multivariable level detection system of the present disclosure. MLD 10 includes probe assembly 20 and device head 18. Probe assembly 20 includes sensors 24a-24n, probe casing 28, probe divider 30, sensor portion 32, and GWR portion 34. Device head 18 includes GWR system 36 and sensor system 38. GWR system 36 includes GWR transceiver 40, and GWR signal processor 42. GWR transceiver 40 includes GWR transmitter 44, and GWR receiver 46.

Device head 18 also includes sensor system 38. Sensor system 38 includes sensors 24a-24n, sensor signal processor 48, and sensor signal lines 50. Sensor system 38 may also include other electrical components required to manage the system. Device head 18 further includes system processor 52, memory 54, local operator interface (LOI) 56, and communication interface 58. All of these components within device head 18 are surrounded by device head enclosure 60.

MLD 10 is mounted to tank 12 (as shown in FIG. 1) where probe assembly 20 is attached to device head 18 and inserted into tank 12, so that it extends downward through gas G1, first liquid L1, and second liquid L2, as shown in FIG. 1. Attached to probe assembly 20 are sensors 24a-24n. Sensors 24a-24n, of sensor system 38, connect to sensor signal processor 48 through sensor signal lines 50.

Probe assembly 20 is also connected to GWR system 36. Within GWR system 36 is GWR transceiver 40, which includes GWR transmitter 44 and GWR receiver 46. GWR transmitter 44 and GWR receiver 46 are connected to GWR signal processor 42. Sensor signal processor 48 and GWR signal processor 42 are electrically connected to system processor 52 through individual conduits. System processor 52 is also electrically connected to memory 54, communication interface 58, and LOI 56. Communication interface 58 may then be connected to an external communication device through a physical electrical connection or a wireless connection. The conductors which connect the various electrical components within MLD 10 may be wiring, cabling, printed circuitry, or other conductor capable of carrying an electronic or electromagnetic signal.

MLD 10 calculates, measures, monitors, and reports a fluid level measurement within tank 12 (refer to FIG. 1). The level of first liquid L1, within a tank is measured through probe assembly 20. Probe assembly 20 has multiple means of sensing parameters to provide an accurate measurement fluid level FL of first liquid L1 within tank 12. The first means of sensing parameters is through GWR system 36.

The primary parameter is derived by GWR system 36 through sending and receiving of microwave pulses by GWR transmitter 44 and GWR receiver 46, respectively, within GWR transceiver 40. These pulses are sent by GWR transmitter 44 when GWR signal processor 42 instructs GWR transmitter 44 to do so. The pulses leave GWR transmitter 44 and are guided down GWR portion 34 of probe assembly 20 into tank 12, gas G1, first liquid L1, and second liquid L2. The microwaves are reflected back by interfaces where a change in dielectric constants between adjacent fluids occurs within the tank. The reflected pulses are detected by GWR receiver 46. GWR transceiver 40 communicates the reflected pulses back to GWR signal processor 42. The time difference between the transmitted pulse and the received reflected pulse is calculated by GWR signal processor 42. GWR signal processor corrects for multiple pulse reflections detected by GWR receiver 46. Multiple pulse reflections may be produced by interfaces of adjacent fluids having differences in dielectric constant within tank 12.

An additional parameter (or parameters) is/are sensed through sensor system 38. In this system, sensors 24a-24n may include temperature sensors, pressure sensors, flow sensors, vibration sensors, accelerometers, various other sensors, or a combination of some or all of those sensors. The additional parameter(s) is/are sensed by sensors 24a-24n and communicated to sensor signal processor 48. Sensor signal processor 48 performs several functions on the received sensor signal(s). The signal(s) will be filtered and amplified, if necessary. The sensor signal(s) will then be converted from analog to digital form.

After being processed by sensor signal processor 48 and GWR signal processor 42, the parameters are communicated to system processor 52. System processor 52 then analyzes the parameters it has received and performs a calculation to determine a level measurement value. The calculated values are stored in memory 54 and are compared by system processor 52 to previously stored values in memory 54. Further calculations may be performed by system processor 52. The results of the calculations and comparisons are then available to be accessed by a user through LOI 56 or an external communications system via communication interface 58.

MLD 10 provides several features that are beneficial. First, MLD 10 requires very few tank modifications. Because the various sensors within MLD 10 are integral to probe assembly 20, there are very few modifications that are required to be made to a tank for the tank to be able to accept probe assembly 20 and MLD 10. In the embodiment shown in FIG. 1, only a single tank penetration is required for a tank to accept MLD 10.

Minimizing tank modifications has several benefits to users, such as lowering the initial cost of the tank to the end user and shortening the lead times of tanks. When the customization of standard tanks or custom tanks are required for a tank application, the time required for a manufacturer to manufacture the tank typically increases. With fewer penetrations, less customization is required, thereby shortening manufacturing time and tank lead times to the customer. This allows for construction schedules to be compressed, saving time and money. Also, minimizing tank modifications will reduce the complexity of service to the tank and probe. With fewer penetrations, fewer replacement parts and service know-how is required.

Further, fewer penetrations means that there are fewer opportunities for tank failure. Penetrations through tanks typically require welds in the tanks and have seals to keep the contents of the tank from escaping. These are generally the weakest points in a tank and are therefore the points most prone to failure. With fewer penetrations, a tank will have fewer weak points and will therefore be less prone to a costly tank failure. Further benefits of MLD 10 are best demonstrated through graph illustration in FIG. 3.

Figure 3:
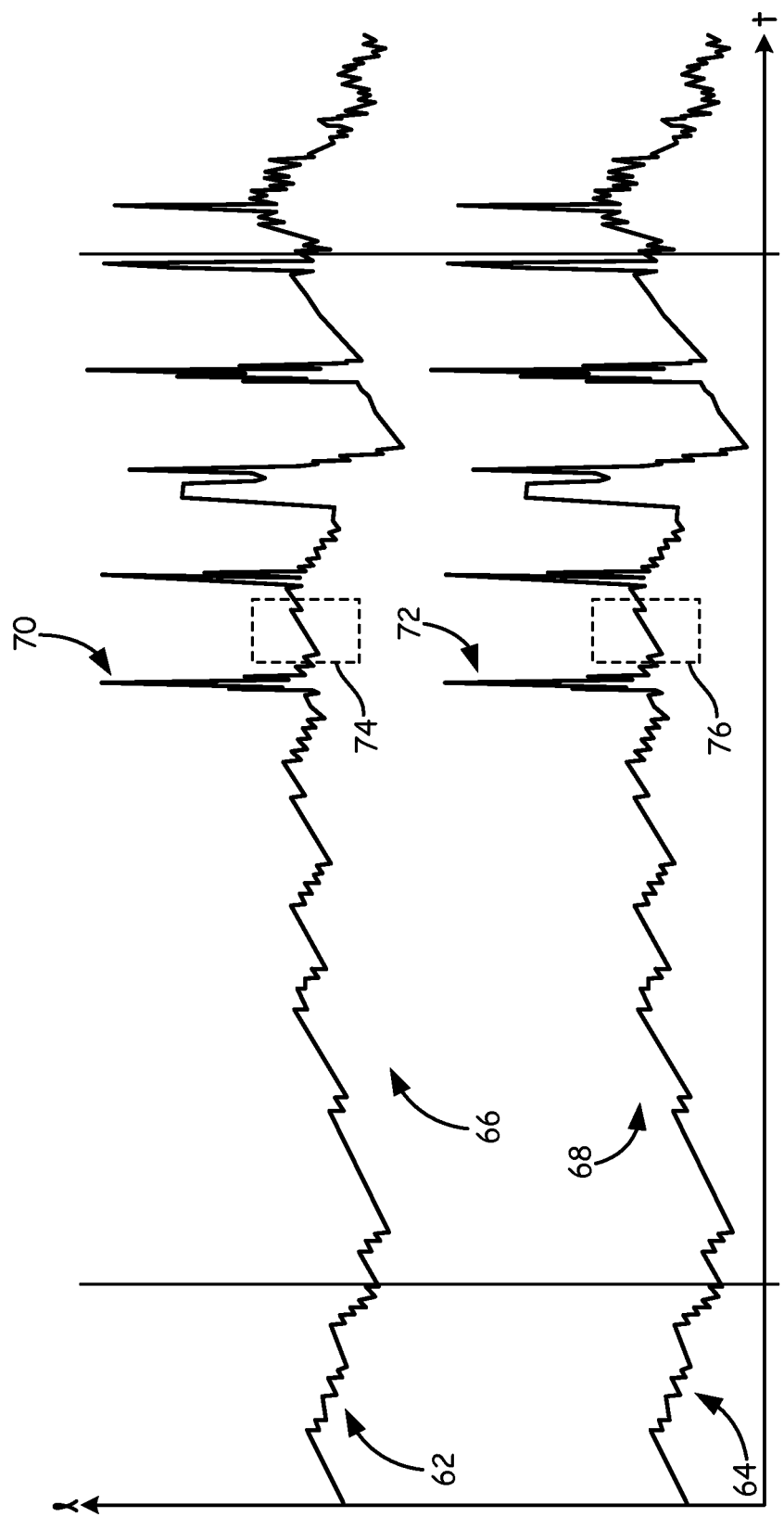
FIG. 3 is a graph illustrating level measurements detected in a guided wave radar level detection system.

FIG. 3 is a graph illustrating level measurements detected in a guided wave radar level detection system. Time (t) is displayed on the x-axis of the graph and level (l) is displayed on the y-axis of the graph, where the origin of the y-axis (O) represents a level (l) of empty and the top of the y-axis represents a level (l) of full. Time (t) moves from the left to the right side of its axis.

Line 62 is a graphic representation of wave reflections detected over time for first liquid L1 within tank 12. Line 64 is a graphic representation wave reflections detected over time of second liquid L2 within tank 12. Both waves are detected by GWR system 36. Region 66 and region 68 are wave detections over time during normal operation where the level in tank 12 increases and decreases slowly. Spike 70 and spike 72 represent rapid increases and decreases in level detection of first liquid L1 and second liquid L2, respectively. Region 74 and region 76 are wave detections over time during normal operation, but between rapid increases in level.

Spike 70 and spike 72 are problematic in a GWR system. Spike 70 and spike 72 are preceded by region 66 and region 68, which indicate a non-full level rising and falling slowly, in an expected manner. Spike 70 and spike 72 are followed immediately by region 74 and region 76, which are also indicative of non-full levels acting as expected. Spike 70 and spike 72 being immediately preceded and followed by these regions suggests that spike 70 and spike 72 are errant level calculations or measurements by a GWR system.

A benefit of MLD 10 is that it improves the accuracy of the level measurement. Several factors, such as errant transmission or reception of the radar wave, a change in tank pressure or temperature, a change in tank fluid flow rate, a change in fluid concentration, or a change in fluid density may influence the accuracy of wave detection by a GWR system. Such influence may result in inaccuracies such as spike 70 and spike 72 of FIG. 3. Theses spikes, if not corrected for error, may lead to incorrect level calculations, which may then lead to incorrect reporting of fluid levels within the tank. This is problematic, because the reporting of a false full condition within a tank can lead to false alarms and unnecessary stoppages in the process for which the tank is being used. These stoppages can be costly.

MLD 10 improves the accuracy of the level measurement by detecting multiple parameters. Combining wave radar detection with the measurement of temperature, pressure, flow, vibration, force, or various other conditions within tank 12 allows for more complex calculations to be made to determine the level within the tank more accurately. For example, a force sensor could be used as sensor 24a to detect movement of probe assembly 20, which is non-rigid in the embodiment depicted in FIG. 1. This movement may cause an improper level measurement by the GWR, such as spike 70 and spike 72 of FIG. 3.

In this example, the force sensor may detect force or acceleration of probe assembly 20 in one or many directions. This type of movement of probe assembly 20 may be due to forces exerted from abnormally high volumetric flow rates or abnormally high pressures of the fluid flowing into the tank. If the movement is detected, it can be accounted for in the calculation and compared to recently stored values of fluid level to determine if the level fluctuation detected, such as spike 70 and spike 72 of FIG. 3, is a true fluctuation of the fluid level or the result of a force on the probe due to system flow effects. This is especially helpful in this example, where the probe is flexible, because a flexible probe is more susceptible to bending due to the forces described above. The result is fewer high fluid level nuisance trips and fewer undesired process shut downs, saving time and money.

In another example, a pressure transducer may be used as a sensor in sensors 24a-24n. Then, system processor 52 may account for changes in the system pressure of tank a tank by comparing previously stored values of tank pressure in memory 54. A change in system pressure can then be used to update the density value for the fluids within tank 12, which may then be used in the level calculation based on the detected reflection time of the microwave, thereby increasing the accuracy of the level measurement. The measurement could be improved in the same manner if a temperature sensor was used.

MLD 10 provides additional accuracy over the prior art in other ways as well. As explained above, combining wave radar detection with the measurement of temperature, pressure, flow, vibration, accelerometer, or various other conditions within tank 12 allows for complex calculations to be made to determine the level within the tank more accurately. Further, combining wave radar detection with the measurement of multiple parameters (or the same parameter at multiple locations) of the above listed conditions within the tank may provide further accuracy.

For example, when a pressure transducer is used as sensor 24a and a temperature sensor is used as sensor 24b, system processor 52 may account for changes in the system pressure and temperature of the first liquid L1 within the tank by comparing previously stored values of first liquid L1's pressure and temperature in memory 54. A change in system pressure and temperature can then be used to update the density value for first liquid L1, which may then be used in the level calculation based on the detected reflection time of the microwave. An updated and accurate density value increases the accuracy of the level measurement. A more accurate fluid density would be determined having used both the temperature and pressure of the fluid within the tank, than if only a pressure or temperature sensor were used.

In another example, a force sensor could be used as sensor 24a and a pressure sensor could be used as sensor 24b. This would allow for detection of probe assembly 20 movements through sensor 24a and would also allow the density value for first liquid L1 to be updated in system processor 52 after a density change is calculated based on pressure readings received from sensor 24b. As explained above this means the accuracy of the level measurement would be increased and high fluid level nuisance trips may be detected and avoided providing an increase in overall system accuracy and redundancy.

In another example, a pressure sensor (or combined pressure and temperature sensor) could be used for each of sensors 24a-24n, spaced vertically along probe assembly 20. Here, MLD 10 can make a preliminary level detection based on the previously stored density value of the fluids and the pulse time differential calculated. Thereafter or simultaneously, system processor 52 can read all of the pressure sensors at the varying heights of probe assembly 20. By knowing the heights of all of the pressure sensors, system processor 52 can then calculate a density gradient for all of the fluids within the tank. The density values can be compared to recent density gradients stored in memory 54, corrected for error, and then updated in the level calculation. A more accurate level calculation can then be performed. Similar calculations may be performed with the substitution or addition of temperature sensors. The addition of acceleration sensors may provide further accuracy and redundancy as described above. Further, sensors with ability to detect fluid level, such as conductivity sensors, may be used in this configuration.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

I claim:

1. A multivariable fluid level detection system comprising:
    a guided wave radar probe;
    a first sensor integral to the probe for producing a first sensor signal that is a function of a first sensed parameter, wherein the first sensor comprises a force sensor and the first sensed parameter is force or acceleration of the probe assembly;
    a transmitter for transmitting guided microwave pulses down the probe;
    a receiver for receiving reflected microwave pulses;
    a processor for producing a measurement of fluid level based upon a time difference between transmission of a pulse and receipt of a reflected pulse and upon the first sensed parameter.

2. The system of claim 1, further comprising a pressure sensor or a temperature sensor.

3. The system of claim 1 and further comprising:
    a second sensor integral to the probe for producing a second sensor signal that is a function of a second sensed parameter;
    wherein the processor produces the measurement of the fluid level based on time difference between transmission of a pulse and receipt of a reflected pulse, the first sensed parameter, and the second sensed parameter.

4. The system of claim 3, wherein the second sensor comprises a pressure sensor.

5. The system of claim 3, wherein the second sensor comprises a temperature sensor.

6. The system of claim 1, wherein the first sensor comprises an accelerometer.

7. The system of claim 6, wherein the accelerometer comprises a tri-axis accelerometer.

8. The system of claim 3, wherein the processor is configured to determine, based on the first sensed parameter, movement of the probe assembly.

9. The system of claim 8, wherein the processor is further configured to compare, if movement of the probe assembly is determined, the measured fluid level with recently stored values of fluid level.

10. The system of claim 9, wherein the processor is further configured to determine, based on the compared measured fluid level with recently stored values of fluid level, whether the measurement of fluid level represents a true fluctuation of the fluid level.

11. A multivariable fluid level detection system comprising:
    a guided wave radar probe;
    a transmitter for transmitting guided microwave pulses down the probe;
    a receiver for receiving reflected microwave pulses;
    a plurality of sensors integrated into the probe for producing a plurality of sensor signals, each of which is a function of a sensed parameter, wherein at the plurality of sensors includes a force sensor and the corresponding sensed parameter is force or acceleration of the probe assembly; and
    a processor for producing a measurement output based upon a time from transmission of a guided microwave pulse to receipt of a reflected microwave pulse and the plurality of sensor signals.

12. The system of claim 11, wherein the plurality of sensors includes one or more pressure sensors.

13. The system of claim 11, wherein the plurality of sensors includes one or more temperature sensors.

14. The system of claim 11, wherein the force sensor is an accelerometer.

15. The system of claim 11, wherein the processor is configured to determine, based on the sensed force or acceleration of the probe assembly, movement of the probe assembly.

16. The system of claim 15, wherein the processor is further configured to compare, if movement of the probed assembly is determined, the measured fluid level with recently stored values of fluid level.

17. The system of claim 14, wherein the accelerometer comprises a tri-axis accelerometer.

18. A method of determining a fluid level within a tank, the method comprising:
    transmitting guided wave pulses down a probe assembly into a first liquid wherein the guided waves reflect off the first liquid;
    detecting reflected wave pulses off the first liquid;
    producing a first signal that is a function of a first sensed parameter wherein the first signal is produced by a first sensor which is integral to the probe assembly, wherein the first sensed parameter is force or acceleration of the probe assembly; and
    producing a measurement output based upon a time from transmission of the guided wave pulses to receipt of the reflected wave pulses and the first sensed parameter.

19. The method of claim 18 and further comprising:
    producing a second signal that is a function of a second sensed parameter wherein the second signal is produced by a second sensor which is integral to the probe assembly; and
    producing a measurement output based upon a time from transmission of a guided microwave pulse to receipt of a reflected microwave pulse, the first sensed parameter, and the second sensed parameter.

20. The method of claim 17, further comprising determining based on the first sensed parameter, movement of the probe assembly.

21. A system for measuring a level of each of a plurality of fluids, the system comprising:
    a guided wave radar probe;
    a transmitter for transmitting guided microwave pulses down the probe;
    a receiver for receiving reflected microwave pulses, the reflected microwave pulses reflected from interfaces between adjacent ones of the plurality of fluids having different dielectric constants;
    a plurality of pressure sensors spaced vertically along the probe for producing a plurality of pressure sensor signals; and
    a processor configured to calculate, based on the plurality of pressure sensor signals, a density gradient of the plurality of fluids and further configured to produce, based on the microwave pulses reflected from the interfaces between adjacent ones of the plurality of fluids having different dielectric constants, a measurement output indicative of the level of each of the plurality of fluids.

22. The system of claim 21, further comprising a temperature sensor.

23. The system of claim 21, further comprising a plurality of temperature sensors spaced vertically along the probe for producing a plurality of temperature sensor signals.

24. The system of claim 23, wherein the processor is further configured, based on the plurality of temperature sensor signals, a temperature gradient of the plurality of fluids.

25. The system of claim 21, further comprising an force sensor configured to detect force or acceleration of the probe assembly.

26. The system of claim 25, wherein the processor is further configured to determine, based on detected force or acceleration, movement of the probe assembly.

27. The system of claim 26, wherein the processor is further configured to compare, if movement of the probe assembly is determined, the measurement output indicative of the level of each of the plurality of fluids with recently stored measurement outputs indicative of the level of each of the plurality of fluids.

28. The system of claim 27, wherein the processor is further configured to determine, based on the comparison of the measurement output indicative of the level of each of the plurality of fluids with recently stored measurement outputs indicative of the level of each of the plurality of fluids, whether the measurement output represents a true fluctuation of the level of each of the plurality of fluids.

* * * * *